Patented Nov. 16, 1937

2,099,351

UNITED STATES PATENT OFFICE 2,099,351

BITUMINOUS EMULSION

Preston R. Smith, Rahway, N. J., assignor, by mesne assignments, to The Barber Company, Inc., Philadelphia, Pa., a corporation of New Jersey No Drawing. Application January 27, 1934,
Serial No. 708,699

6 Claims. (Cl. 134—1)

This invention relates to bituminous emulsions, and more particularly to emulsions of the clay type, dried films of which are rendered resistant to water by the incorporation in the emulsions and in the films resulting therefrom of certain substances.

Emulsions of certain types consisting only of an emulsifying agent, a bitumen and water give dry films which are fairly resistant to the action of water. That is, re-emulsification does not tend to take place readily so that surfaces carrying films of the emulsion may be exposed to the weather, i. e. rain or dampness, without substantial effect thereon. On the other hand, various bituminous emulsions, notably those in which clay is used as the emulsifying agent, give films which are very sensitive to the action of water, re-emulsification taking place very readily. It has been found that the addition of various substances to such emulsions will render the films substantially unaffected by the action of water.

The present invention relates to bituminous emulsions, particularly of the clay type, in which a material such as bentonite, or other colloidal clay or insoluble metallic oxide, hydroxide or silicate having a substantial proportion of particles of a colloidal character, is used as the emulsifying agent and in which there is incorporated a salt of a metal such as zinc, cadmium and mercury, falling in the zinc sub-group, namely in the righthand column or second series of the second periodic group as given, for example, in Mellor's Modern Inorganic Chemistry, 1920.

To illustrate the action of these agents in rendering the films resulting from the emulsion resistant to water the effects produced by the addition of the various substances in accordance with the present invention will be considered when these substances are added to a basic bituminous emulsion, films of which are destroyed very readily by the application of water. This basic emulsion which will be hereafter discussed is a water emulsion in which bentonite is used as the emulsifying agent and which has the following composition:

| | |
|---|---|
| Bitumen | 45% to 67%, preferably 50% |
| Bentonite | 2% to 10%, preferably 7.5% |
| Water | 25% to 55%, preferably 43.5% |

In the following examples where a percentage of salt in the emulsion is given it means that the finished emulsion contained the indicated quantity of the salt.

Zinc carbonate is effective to a degree in proportions ranging from 4% to 10%. Using these proportions of this salt, it is found that the films obtained are unaffected by water.

Zinc chloride thickens the emulsion even when used in very small amounts, there being but little difference between 0.5% and 10% in this respect. The films are unaffected by water.

Zinc bromide, $ZnBr_2$, zinc iodide, $ZnI_2$, and zinc fluoride, $ZnF_2$, when used in proportions of 1 to 10% produce films completely resistant to water and having characteristics similar to those produced by the use of zinc chloride.

Zinc nitrate, $Zn(NO_3)_2.6H_2O$, in ranges from 0.1% to 10% produces films unaffected by water. The emulsion in this case has a very bright and smooth appearance. The surface tension characteristics appear to be about the same as those obtained with zinc chloride.

More specifically, to an emulsion having the composition 58% asphalt, 2.5% bentonite, 39.5% water, there may be added 0.6% zinc nitrate based on the asphalt dissolved in a small amount of water. This is equivalent to about 0.4% of zinc nitrate in the emulsion, the temperature of the emulsion should preferably be below 100° F. during the addition. This emulsion is found to show a marked improvement in adhesion to iron as compared with clay emulsions previously made, the improved adhesion being particularly marked at low temperature.

Zinc sulphate, $ZnSO_4.7H_2O$, renders the films resistant to water when used in proportions from about 0.1% to 10%. The zinc sulphate thickens the emulsion. In cases where large proportions are used the dried film sometimes has a white appearance due apparently to the efflorescing of the zinc salt.

Zinc phosphate, $Zn_3(PO_4)_2$, in proportions of 1% to 10% produces films resistant to water.

Zinc cyanide, $Zn(CN)_2$, produces water resistant coatings when used in proportions ranging from 1 to 10%. The zinc cyanide is substantially insoluble in water and is very bulky so that it is generally necessary to add considerable water to the emulsion with the cyanide to attain ready admixture.

Zinc acetate, $Zn(C_2H_3O_2)_2.3H_2O$, zinc oxalate, $ZnC_2O_4.2H_2O$, and zinc tannate are effective in proportions ranging from about 0.6% to 10% in producing films which are unaffected by water.

In view of the properties of the zinc salts in increasing the resistance of films resulting from the emulsions to water, it would be suspected that cadmium and mercury salts would exhibit similar properties. This is borne out by the following examples in which the cadmium and mercury salts are added to the same basic emulsion noted above which, as already stated, produced films which are readily washed off by water.

Cadmium nitrate, Cd(NO$_3$)$_2$.4H$_2$O, used in proportions ranging from 1% to 10% produces films completely resistant to water. Cadmium sulphate, 3CdSO$_4$.8H$_2$O, used in proportions ranging from 0.5% to 10% has a similar effect. While the nitrate produces some slight thickening of the emulsion, the sulphate does not have any thickening action. Both of these salts are very soluble in water.

Of the mercury salts the following examples may be cited:

Mercuric chloride, HgCl$_2$, in proportions ranging from 1% to 10% produces films entirely unaffected by water. The emulsion is thickened by the use of this salt.

Mercurous nitrate, HgNO$_3$, in proportions from 0.5% to 10% produces films unaffected by water. The emulsion is thickened very markedly by the use of this salt which seems to have some tendency to break the emulsion.

Mercuric nitrate, Hg(NO$_3$)$_2$, which is converted by the hydrolytic action of water more or less completely to the basic nitrate produces films unaffected by water when used in proportions from 0.5% to 10%. Mercuric acetate Hg(C$_2$H$_3$O$_2$)$_2$ in proportions from 0.5% to 10% produces films unaffected by water. The mercuric acetate thickens the emulsion.

Mercurous sulphate, Hg$_2$SO$_4$, in proportions from 1% to 10% produces water resistant films. The emulsion is considerably thickened by this salt.

Mercuric sulphate, HgSO$_4$, in proportions ranging from 0.5% to 10% produces films which are unaffected by water. Mercuric sulphate is decomposed by water forming a basic sulphate of relatively low solubility.

From the above it will be seen that dried films of clay emulsions are rendered resistant to water by the use of very small amounts of salts of zinc, mercury and cadmium. In most cases, less than 0.5% appears to be substantially effective, although in certain cases the effectiveness is not so pronounced until a larger percentage of the salt is used.

While the above examples are given with reference to an emulsion which gives films of very poor character from the standpoint of water resistance, similar results are found to be given with other clay emulsions. If the basic clay emulsion used is of a character giving films having substantial resistance to water, then it is possible to use much smaller precentages of the added substances to attain complete resistance to washing. The effects of the various salts upon the emulsion itself do not appear to follow any general rule.

The various substances can be added to the previously formed emulsion, or may be added to the clay before the asphalt is emulsified thereby. So long as a substance is finally incorporated in the emulsion it does not seem to be material how the addition thereof is effected.

It is not contemplated that oxides are or shall be considered to be equivalents for the salts defined by the claims appended hereto.

What I claim and desire to protect by Letters Patent is:

1. A stable, aqueous clay emulsion of bitumen of the oil-in-water type including bitumen dispersed in water through the medium of clay, the clay being present in amount such that a dried, substantially hard film formed with the emulsion will readily re-emulsify in the presence of water, and a salt of a metal of the second series of the second periodic group dispersed in the water-continuous-phase of the emulsion, said salt being present in amount such that the tendency of a dried film formed with the emulsion to re-emulsify will be negatived and such that such film will be substantially resistant to water.

2. A stable, aqueous clay emulsion of bitumen of the oil-in-water type including bitumen dispersed in water through the medium of clay, the clay being present in amount such that a dried, substantially hard film formed with the emulsion will readily re-emulsify in the presence of water, and a zinc salt dispersed in the water-continuous-phase of the emulsion, said salt being present in amount such that the tendency of a dried film formed with the emulsion to re-emulsify will be negatived and such that such film will be substantially resistant to water.

3. A bituminous film formed by the evaporation of water from a bituminous emulsion of the oil-in-water type including bitumen having dispersed therein clay and a salt of a metal of the second series of the second periodic group dispersed in the water-continuous-phase of the emulsion, the clay being present in amount such that the bitumen will readily re-emulsify and the salt being present in amount such that the dried film will be substantially resistant to water and to re-emulsification.

4. A bituminous film formed by the evaporation of water from a bituminous emulsion of the oil-in-water type including bitumen having dispersed therein clay and a zinc salt dispersed in the water-continuous-phase of the emulsion, the clay being present in amount such that the bitumen will readily re-emulsify and the salt being present in amount such that the dried film will be substantially resistant to water and to re-emulsification.

5. A stable, aqueous clay emulsion of bitumen of the oil-in-water type including bitumen dispersed in water through the medium of clay, the clay being present in amount such that a dried, substantially hard film formed with the emulsion will readily re-emulsify in the presence of water, and a salt selected from the group consisting of a salt of a metal selected from the group consisting of zinc, cadmium and mercury and dispersed in the water-continuous-phase of the emulsion, said salt being present in amount such that the tendency of a dried film formed with the emulsion to re-emulsify will be negatived and such that such film will be substantially resistant to water.

6. A bituminous film formed by the evaporation of water from a bituminous emulsion of the oil-in-water type including bitumen having dispersed therein clay and a salt of a metal selected from the group consisting of zinc, cadmium and mercury and dispersed in the water-continuous-phase of the emulsion, the clay being present in amount such that the bitumen will readily re-emulsify and the salt being present in amount such that the dried film will be substantially resistant to water and to re-emulsification.

PRESTON R. SMITH.